No. 11,967. Reissued Feb. 11, 1902.

E. ROCHE.

BOOT OR SHOE.

(Application filed May 31, 1901.)

WITNESSES.

John Palmer

Henry A. Palmer

INVENTOR.

Edward Roche

UNITED STATES PATENT OFFICE.

EDWARD ROCHE, OF PROVIDENCE, RHODE ISLAND.

BOOT OR SHOE.

SPECIFICATION forming part of Reissued Letters Patent No. 11,967, dated February 11, 1902.

Original No. 634,588, dated October 10, 1899. Application for reissue filed May 31, 1901. Serial No. 62,491.

*To all whom it may concern:*

Be it known that I, EDWARD ROCHE, of Providence, in the county of Providence and State of Rhode Island, have invented certain new and useful Improvements in Boots or Shoes, of which the following is a specification.

The chief object of the present invention is to improve the construction of boots and shoes, so as to provide a yielding support for the arch of the foot, with the result of obviating flat-footedness, preventing gout and rheumatic pains, and relieving the shock of the heel striking the ground, while at the same time enabling the wearer to walk with greater ease and less fatigue than with shoes as commonly constructed. My invention by providing a yielding support for the tarsal bones prevents such relaxation of the muscles as to permit dropping of said bones, with resultant excruciating pains in the metatarsal bones, the instep, and the heel along the achilles tendon, such pains frequently extending to the upper portion of the leg.

With the above-stated object in view the invention consists in certain novel features of construction and combinations of parts, the essential elements of which are recited in the appended claims, and a preferred form of embodiment of which is specifically described hereinafter and illustrated in the accompanying drawings, whereof—

Figure 1:
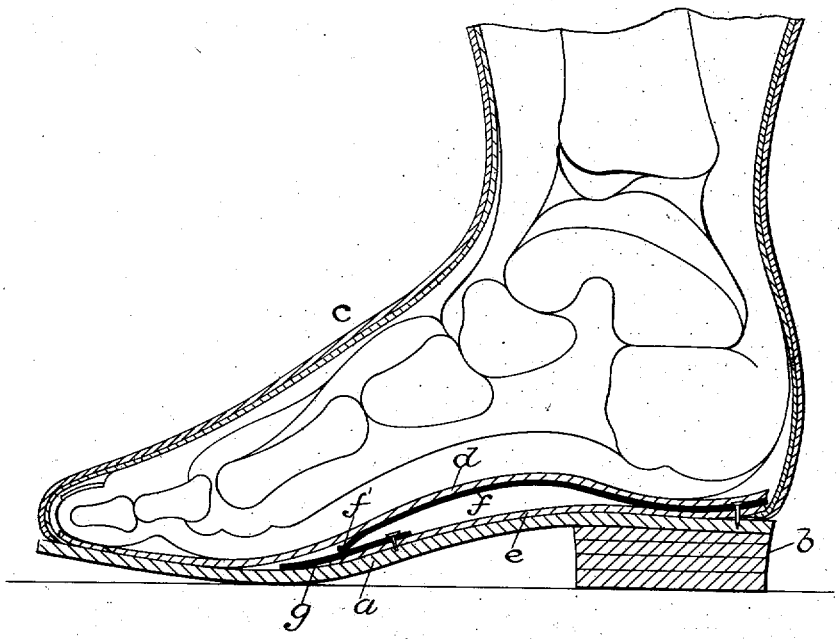
Figure 2:
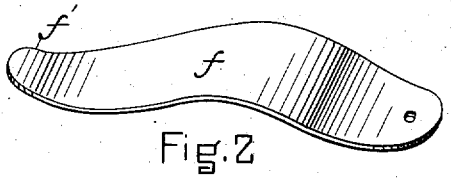
Figure 3:
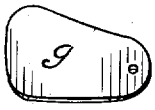

Figure 1 represents in longitudinal section a shoe constructed in accordance with my invention, together with a diagrammatic representation of the structure of the foot incased within the shoe. Figs. 2 and 3 represent in perspective detached parts employed in carrying out the invention.

In the drawings the reference-letter *a* designates the outer sole of the completed shoe, *b* the heel thereof, and *c* the upper. The insole structure comprises two overlapping members *d* and *e*, the former being united with the outer sole and the upper in the forward part of the shoe as far back as the ball, and the other member *e* being united with the outer sole and the upper from the ball of the shoe back to the heel, so that these members together provide the necessary foundation for the shoe. That part of the member *d* extending from the ball to the heel is left free, and beneath it there is placed a curved plate-spring *f*, which at the rear conforms with the seat of the heel, at the middle part is arched to conform with the arch of the foot, and at the forward end is turned up slightly, as shown at *f'*, to rest against a bearing-plate *g*, overlying the insole member *e* and preferably secured thereto, the spring *f* being preferably secured at its rear end, where it rests over the heel. The insole member *d* completely covers the spring *f*, and the foot, bearing upon the insole member, will be provided a support for the arch by said spring, which from its yielding nature and the provision for its forward end sliding upon the bearing-plate *g* will readily adapt itself to various curvatures of the arch of the foot.

In the construction of the shoe the insole member *d* is laid on the last, extending from end to end thereof, and rounded thereto in the ordinary way. Then the insole member *e* is superposed on the member *d*, extending from the ball portion thereof back to the end of the heel, and may be secured thereto by tacks or otherwise at the forward edge, which will preferably be skived to secure a smooth juncture with the full-length member. The forward part of the latter and the whole of the member *e* together then constituting the foundation of the shoe, the upper will be lasted over them, the same as usual in the construction of the ordinary shoe, and so with subsequent operations, such as incorporation of welt and application of outer sole. The plates *f g* can be inserted and secured in place after the shoe has otherwise been completed.

It will be seen that with a construction such as above described the objects, primarily stated, will be thoroughly fulfilled, for the curved spring affords a support which will prevent the dropping of the tarsal bones. Another advantage of the invention is that ventilation of the shoe is promoted by the formation of an air-chamber under the spring.

Having thus described my invention, what I claim as new is as follows:

1. In a boot or shoe an insole structure comprising overlapping members, the innermost one of which extends the full length of the shoe and is loose from the ball of the shoe to the heel, and the outermost one of which extends from the heel to the ball of the shoe, this outermost portion together with that portion of the innermost member which extends from the ball to the toe of the shoe constituting the foundation of the shoe; and a plate-spring between said loose portion of the inner member of the insole structure and the other member thereof curved from the heel to the ball to conform with the natural arch of the foot, the forward end of the said spring being free to slide between the members of the insole structure where they break joint, substantially as and for the purpose described.

2. In a boot or shoe an insole structure comprising overlapping members, the outermost one of which together with the forward portion of the other constitutes the foundation for the shoe, that portion of the innermost member which extends from the ball to the heel being loose; and a curved spring beneath the said loose portion resting at the rear upon the seat of the heel with which it conforms and to which it is fastened, and arched from the heel to the ball to conform with the natural arch of the foot, the forward end of said spring being free to slide back and forth between the two members of the insole structure where they break joint, substantially as described.

3. In a boot or shoe an insole structure comprising overlapping members, the outermost one of which together with the forward portion of the other constitutes the foundation for the shoe, that portion of the innermost member which extends from the ball to the heel being loose; a curved spring beneath the said loose portion resting at the rear upon the seat of the heel; and a bearing-plate for the forward end of the spring, substantially as described.

In testimony whereof I have signed my name to this specification in the presence of two subscribing witnesses.

EDWARD ROCHE.

Witnesses:

JOHN PALMER,

HENRY A. PALMER.